(12) United States Patent
Yakushigawa et al.

(10) Patent No.: US 7,117,653 B2
(45) Date of Patent: Oct. 10, 2006

(54) FLAVORING SYSTEM AND METHOD

(75) Inventors: Yasushi Yakushigawa, Shiga (JP);
Adrian Meredith Sunter,
Worcestershire (GB)

(73) Assignee: Ishida Co., Ltd., Kyoto (JP)

( * ) Notice: Subject to any disclaimer, the term of this patent is extended or adjusted under 35 U.S.C. 154(b) by 34 days.

(21) Appl. No.: 10/444,717

(22) Filed: May 23, 2003

(65) Prior Publication Data

US 2004/0231299 A1    Nov. 25, 2004

Related U.S. Application Data

(63) Continuation of application No. PCT/GB01/05204, filed on Nov. 6, 2001.

(30) Foreign Application Priority Data

Nov. 27, 2000  (JP)  .............................. 2000-360063
Dec. 6, 2000   (JP)  .............................. 2000-370991

(51) Int. Cl.
*B65B 1/32* (2006.01)
(52) U.S. Cl. .............................. 53/53; 53/154; 53/502
(58) Field of Classification Search .................. 53/551, 53/53, 502, 503, 111 RC, 154, 155, 393; 426/232, 392
See application file for complete search history.

(56) References Cited

U.S. PATENT DOCUMENTS

| 3,638,392 | A | * | 2/1972 | Welker et al. | ................. | 53/503 |
| 4,814,072 | A | * | 3/1989 | Von Wichert et al. | ...... | 209/535 |
| 5,335,480 | A | * | 8/1994 | Zaeske et al. | ................. | 53/431 |
| 5,361,560 | A | * | 11/1994 | Sandolo | .................. | 53/111 RC |
| 5,543,163 | A | * | 8/1996 | Groves | ......................... | 426/231 |
| 6,070,385 | A | * | 6/2000 | Antonio | ......................... | 53/53 |
| 6,358,546 | B1 | * | 3/2002 | Bebiak et al. | .............. | 426/232 |

* cited by examiner

*Primary Examiner*—John Sipos
*Assistant Examiner*—John Paradiso
(74) *Attorney, Agent, or Firm*—Beyer Weaver & Thomas LLP

(57) ABSTRACT

A flavoring system has a portioning device such as a weigher for receiving unflavored food items and sequentially supplying batches of a specified quantity of them, dispenses measured quantities of a flavoring material with a dispenser, applies these measured quantities of flavoring material to the supplied batches and packages the flavored batches of items in a bag. A sensor monitors the discharge of the flavoring material and a sorting device discards packaged products if the sensor detects an abnormality in the discharge of the flavoring material. A plurality of dispensers may be provided for dispensing measured quantities of different flavoring materials.

16 Claims, 8 Drawing Sheets

| Item No. | Article Name | Seasoning Type | Weight per Bag (Target Weight) | Ratio of Seasoning | Speed of Operation | Production Schedule |
|---|---|---|---|---|---|---|
| 01 | Potato chips(light salt) | #1 | 100 | 5 % | 100bpm | 10,000 |
| 02 | Barbecue flavor | #2 | 100 | 7 % | 120bpm | 5,000 |
| 11 | Mayonnaise flavor | #5 | 80 | 5 % | 80bpm | 5,000 |
| 21 | ---- | ---- | ---- | ---- | ---- | ---- |
| 33 | ---- | ---- | ---- | ---- | ---- | ---- |

US 7,117,653 B2

FLAVORING SYSTEM AND METHOD

This application is a Continuation application of copending prior-filed International (designating the United States) Application No. PCT/GB01/05204 filed on Nov. 26, 2001, which claims priority based on Japaneses Patent Applications 2000-360063 filed Nov. 27, 2000 and 2000-370991 filed Dec. 6, 2000.

BACKGROUND OF THE INVENTION

This invention relates to a flavoring system and method, particularly for use in snack food production in which a flavoring such as salt or a spice is applied onto potato chips or the like after they are taken out of a frying machine.

Apparatus for adding flavoring to snack food items such as potato- or corn-based items have been described, for example, in Japanese Patent Publications Tokko 4-35132 and 2689139 and U.S. Pat. Nos. 5,090,593 and 5,846,324. In these prior are apparatus, food items such as potato chips taken out of a frying machine are introduced into a rotary drum and a flavoring material is added at a specified ratio to mix them together. Whenever a different kind of flavoring material is to be used, it is necessary to wash all components downstream of the flavoring apparatus. This typically includes a weighing machine for dividing received items into batches of a specified weight to be made into individual packaged products.

It now goes without saying that washing all these devices on the downstream side is both cumbersome and time-consuming. Moreover, since all these devices must be stopped during such a washing operation, it has a significantly adverse effect on the productivity of the system.

When devices on a production line are to be washed, the one on the upstream side is stopped first but those on the downstream side are allowed to continue operating until the products being processed thereby are all discharged. Since the operator cannot exactly control the number of finally outputted products before the system is completely stopped, there may be left a container which is only incompletely filled with finished products.

In view of such problems with prior art systems, it may be proposed to provide as many flavoring systems as there are different kinds of flavoring materials to be used, each system being used for applying only one kind of flavoring material. This, however, will affect the equipment cost adversely. Moreover, one cannot do away with the washing if the consumers' taste changes and a new kind of flavoring must be introduced.

Another problem with prior art flavoring apparatus is that food items of different sizes remain inside the apparatus for different periods of time. As a result, the rate of application on individual food items cannot be made uniform even if the quantity of added flavoring material is adjusted according to the flow rate of items.

Still another problem is that a material such as stainless steel must be used for devices on the downstream side because flavoring materials often contain salt. Since the parts that come into contact with food items must be easily detachable, the device becomes accordingly more complicated and expensive to produce.

An apparatus is known for packaging quantities of a frozen product in which a sauce is supplied into the same packaging following portioning of the product. However, this is not suitable for handling flavoring for snack food items.

SUMMARY OF THE INVENTION

It is therefore an object of this invention, in view of the problems of the prior art technology described above, to provide an improved flavoring system which does not require washing operations although they were necessary with conventional systems when a different kind of flavoring material was to be used.

It is another object of this invention to provide such a flavoring system with which differently flavored products can be produced according to a preliminarily planned schedule and a change in the kind of flavoring material to be applied can be effected quickly, or even automatically.

It is still another object of this invention to provide a method of flavoring food items to be packaged without the necessity of washing many components of the system used for the method whenever a different kind of flavoring material is to be used.

A flavoring system according to this invention may be characterized as comprising a portioning device for receiving items and sequentially supplying batches of a specified quantity of these items, a flavoring dispenser for dispensing measured quantities of a flavoring material, an applying device downstream of the portioning device for individually applying the measured quantities of flavoring material to the batches of items, a packaging device downstream of the applying device for packaging the batch of items in a bag, a sensor for monitoring discharge of flavoring material and a sorting device for discarding a packaged product packaged by the packaging device if the sensor detects an abnormality in the discharge of the flavoring material.

A control unit may be further included for operating the portioning device, the dispenser and the flavoring device in a mutually correlated manner. If the portioning device discharges a defective batch which is not of the specified quantity of the items, the control unit may control such that the flavoring material is not applied to the defective batch discharged from the portioning device. The applying device may be adapted to apply the flavoring material at a set ratio to each of the batches of the specified quantity. The applying device and the dispenser may be exchangeably attached to the flavoring system. The applying device may include a charging device for electrically charging particles of the flavoring material and an ejecting device for ejecting the electrically charged particles of the flavoring material towards the items of the batch. The applying device may further include a mixing device for mixing together the flavoring material and each of the batches of items.

The portioning device may comprise a weighing device which serves to supply the items to a plurality of weigh hoppers, to measure the individual weights of the items in these weigh hoppers, to select a combination of the weigh hoppers with a specified weight on the basis of the measured weights and to thereby supply one of the batches. The applying device may be simply one of a plurality of applying devices adapted to receive the items from a common supplying device, each of the plurality of applying devices applying a different flavoring material. The control unit may operate the packaging device in a mutually correlated manner with the other components of the flavoring system. The applying device may serve to coat the items with the flavoring material.

The packaging device may be a vertical pillow packaging machine of a known kind, serving to form an elongated film into a tubular form to produce a bag while filling the bag with the batch of items, to seal the film between this bag and another bag being subsequently formed, and to cut the film to separate them one bag from the other.

A method of flavoring items according to this invention may be characterized as comprising the steps of sequentially providing batches of items of a specified quantity, dispensing measured quantities of a flavoring material, applying each of the measured quantities of flavoring material to a respective one of the batches of items, and packaging the flavored items. The quantity of flavoring material may be determined in accordance with the number, the weight or the volume of items in the batch.

Throughout herein, the items may be food items and the flavoring material may be in the form of particulate, powder or liquid.

It is to be noted in particular, in contrast to the prior art, that an applying device is incorporated downstream to the portioning device such that the flavoring material is applied to the items, rather than during a subsequent cooking step. In addition, the system according to this invention overcomes the washing problems mentioned above. Thus, since the flavoring material is applied after the items are portioned into batches of a specified quantity by means of a weighting machine or the like, the flavoring material being applied does not come into contact with the weighing device and it becomes unnecessary to wash the weighing machine each time a new flavoring material is selected. Thus, the system need not be stopped for a washing operation and hence the productivity improves dramatically. Since the flavoring operations are carried out for each of the batches, the flavoring material can be supplied according to the content of each batch and hence the quality of taste can be made uniform among the products. Moreover, since the weighing device need not be washed, it need not be detachably structured. Thus, such a system can be provided more inexpensively.

The invention allows differently flavored products to be produced according to a preliminarily planned schedule and a change in the kind of flavoring material to be applied can be effected quickly, or even automatically. An important aspect of the invention is that the items can be coated, preferably uniformly, with the flavoring material. The invention enables the flavoring material to be changed instantly such that differently flavored products can be produced on a single production line. Moreover, this invention provides a flavoring system that is inexpensive and durable. Flavoring materials typically includes seasoning such as salt and spices but may also include other particulate, powder or liquid that may typically require to be applied reasonably uniformly. Flavoring materials according to this invention may also include chemical flavors commonly referred by "E numbers" such as cheese and onion flavors. The items are typically snack food products such as potato chips but could include other foodstuffs such as cereals, nuts, biscuits, confectionery, etc. The items are typically unseasoned and unflavored prior to the portioning operation but can already be partly seasoned.

The portioning device is typically a weigher but the portioning may be effected also by number, volume or even by type of item.

BRIEF DESCRIPTION OF THE DRAWINGS

Some examples of systems and methods according to the present invention will now be described with reference to the accompanying drawing, in which.

DETAILED DESCRIPTION OF THE INVENTION

Figure 1:
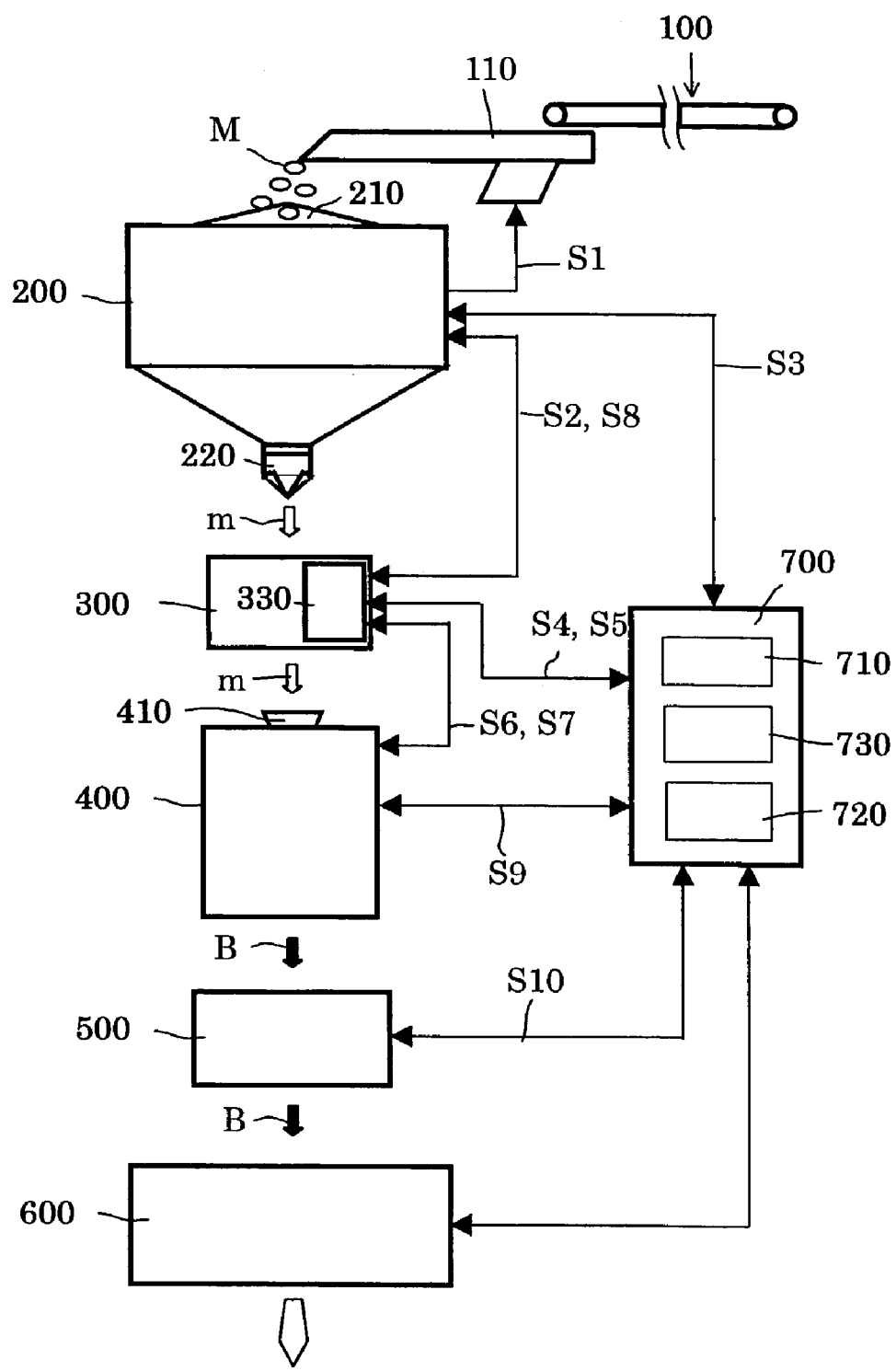
FIG. 1 is a schematic block diagram for showing the basic structure of a flavoring system embodying this invention.

The invention is described next by way of an example. FIG. 1 shows the basic structure of a flavoring system embodying this invention including a transporting device 100 for transporting unseasoned or unflavored food items, a weighing device 200 for portioning or partitioning the food items transported by the transporting device 100 into batches of a specified quantity for filling one bag, a flavoring device 300 for applying a flavoring material to each batch of the food items, a packaging device 400 for packaging the flavored food items, a sorting device 500 for eliminating from the production line defective products caused by an error in weighing or application of flavoring material, a packing device 600 for packing packaged products in a box, and a control unit 700 for not only controlling each of the devices 100, 200, 300, 400, 500 and 600 but also coordinating their operations.

The transporting device 100 is for receiving food items from a frying machine (not shown) and transporting them to the weighing device 200. A vibrating feeder 110 is provided at its downstream end for supporting thereon the transported food items. When a supply-requesting signal S1 is received from the weighing device 200, the vibrating feeder 110 vibrates for a specified length of time to deliver the food items thereon to the weighing device 200.

The weighing device 200 is for receiving the food items delivered by the vibrating feeder 110 and producing batches of the food items each for filling one bag as a finished product. It has a dispersion feeder 210 at the top, and when the amount of the food items thereon becomes too small, it transmits the aforementioned supply-requesting signal S1 to the vibration feeder 110.

When a discharge-requesting signal S2 is received from the flavoring device 300, the weighing device 200 opens its timing hopper 220 to discharge the food items m of a specified amount which have been held therein. Thereafter, the weighing device 200 starts its weighing operations to portion another batch with a specified quantity and discharges this new batch into the timing hopper 220 which has just been emptied and is waiting for the next discharge-requesting signal S2.

The purpose of this weighing device 220 is to portion the food items and to discharge these portioned batches. The portioning need not be in terms of weight but may be in terms of volume. In the case of a snack food of the type having individually different sizes, it is convenient to use a combinational weigher such as described in U.S. Pat. No. 5,757,866 issued May 19, 1998, adapted to use a dispersion feeder 210 to distribute food items supplied at the top center among a plurality of weigh hoppers, to measure the individual weights of the items in these weigh hoppers, and to select a combination of the weigh hoppers such that the total of the weights of the items in the selected combination of the weigh hoppers will be of a specified magnitude. With a weigher of this type, even irregularly shaped items can be portioned accurately.

If an error is committed in the weighing, the weighing device 200 transmits an error signal S3 to the control unit 700. Upon receiving an error signal S3, the control unit 700 transmits a stop signal S4 to the flavoring device 300 to stop its operation. Thus, if a batch with an incorrect quantity is discharged, this batch is not flavored and may be collected to be used for producing a differently flavored product or be recycled for use with the same flavor.

Figures 2, 6:
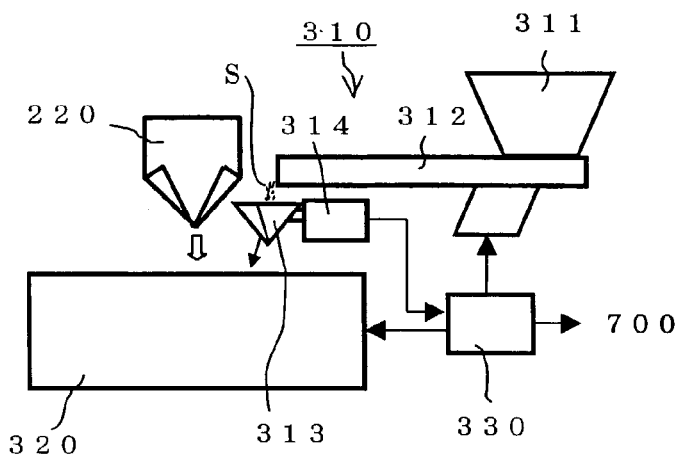
FIG. 2 is a schematic block diagram for showing the basic structure of a seasoning device such as shown in FIG. 1.
FIG. 6 shows how data may be stored in a memory.

As shown in FIG. 2, the seasoning device 300 includes a supplying device or a dispenser 310 for discharging a flavoring material, a mixing device 320 constituting an applying device for mixing the discharged flavoring material and the batch of food items m discharged from the timing hopper 220, and a control device 330 for controlling the supplying device 310 and the mixing device 320.

The supplying device 310 includes a charge hopper 311 for storing the flavoring material, a vibratory feeder 312 for transporting the flavoring material inside the charge hopper 311 to its front end little by little, a weigh hopper 313 for receiving the flavoring material S from the vibratory feeder 312 and weighing the received flavoring material and a weight sensor 314 for measuring the weight of the weigh hopper 313.

The control device 330 drives the feeder 312 while monitoring the value measured by the weight sensor 314. When a specified quantity of the flavoring material has been received by the weigh hopper 313, the feeder 312 is stopped. If the flow rate of the flavoring material from the charge hopper 311 or the amount of the flavoring material therein is insufficient and the specified quantity of the flavoring material fails to be received by the weigh hopper 313 within a specified length of time, the control device 330 concludes that an abnormal condition has occurred and outputs a discharge abnormality signal S5 to the control unit 700. Upon receiving the discharge abnormality signal S5, the control unit 700 outputs signals S9 and S10 to the packaging device 400 and the sorting device 500 to eliminate defective products which have not been flavored properly.

Figure 5A:
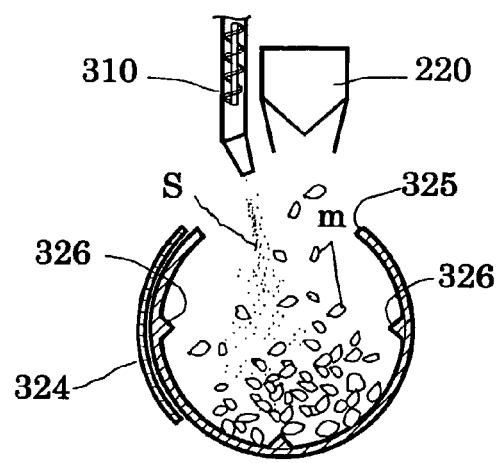
FIGS. 5A, 5B and 5C are schematic sectional views for showing how food items and a flavoring material are mixed together.

The structure of the supply device 310 depends on the form of the flavoring material. If the flavoring material is in a liquid form, an air spray device may be appropriate. If the flavoring material is in the form of a paste, a screw conveyor capable of controlling the supply according to its angle of rotation may be used. If the flavoring material is in a granular or powder form, a device capable of controlling the supply according to the volume may be preferred. In other words, although a screw conveyor is schematically shown in FIG. 5A, this is not intended to limit the scope of this invention.

Although FIG. 2 shows an embodiment whereby an abnormality in the supply rate of the seasoning material is detected by the weight measured by the weigh hopper 313, neither is this intended to limit the scope of the invention. The method of detecting an abnormal situation varies, depending on the mechanism for supplying the flavoring material. If the flavoring material is a liquid, for example, an abnormal condition may be detected by means of a flow rate sensor. Whatever the form of the flavoring material, an abnormal supply condition may be detected by means of a weight sensor to monitor the rate of its decrease. In summary, a system according to this invention is capable of dependably preventing improperly flavored products from being shipped.

The mixing device 320 is for mixing and applying the flavoring material on only one batch at a time of the flavoring material. Thus, it may be much smaller than the conventional mixers such as disclosed in U.S. Pat. Nos. 5,090,593 and 5,846,324.

Figure 3:
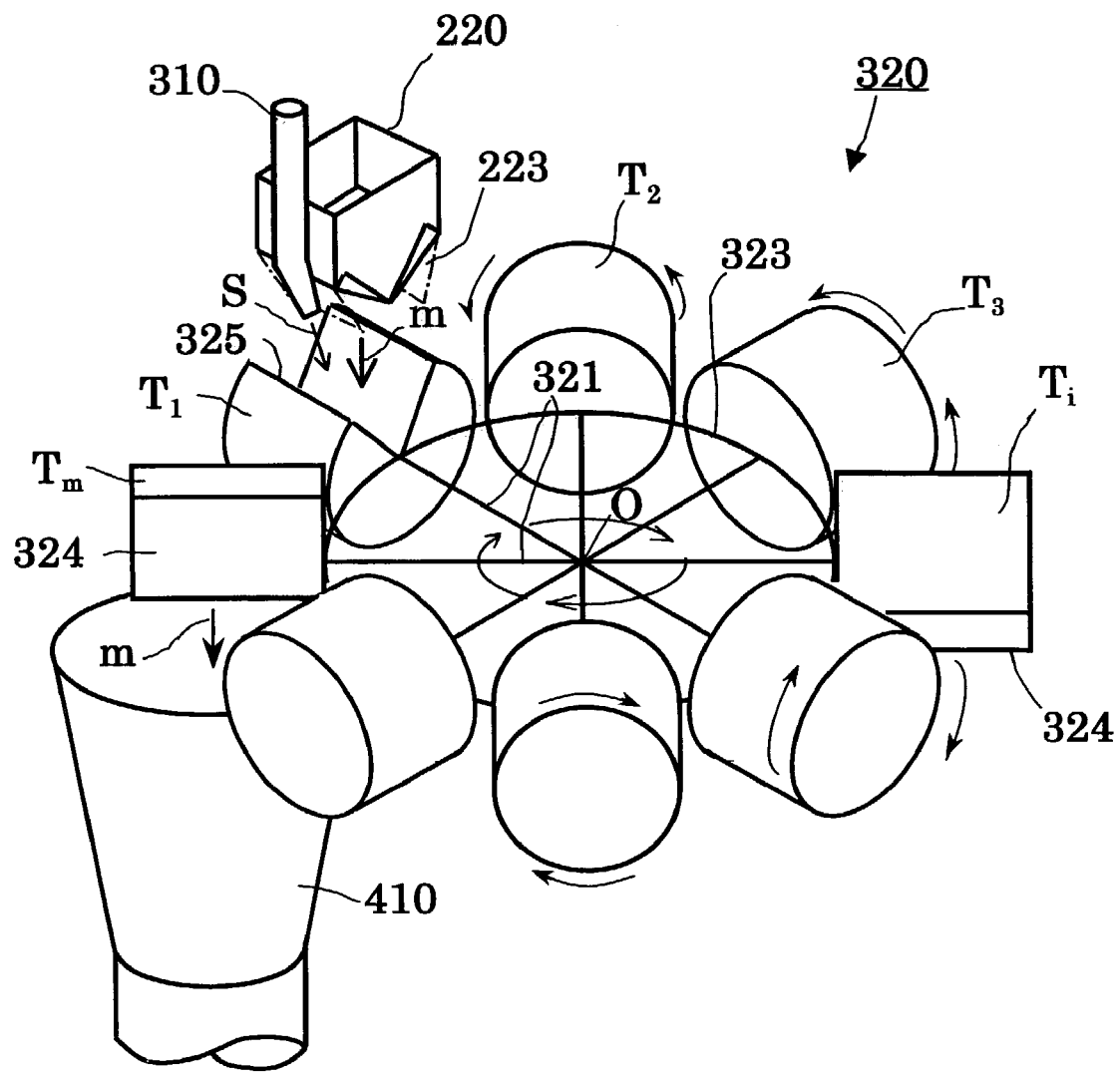
FIG. 3 is a schematic diagonal view of a mixing device such as shown in FIGS. 1 and 2.
Figure 4A:
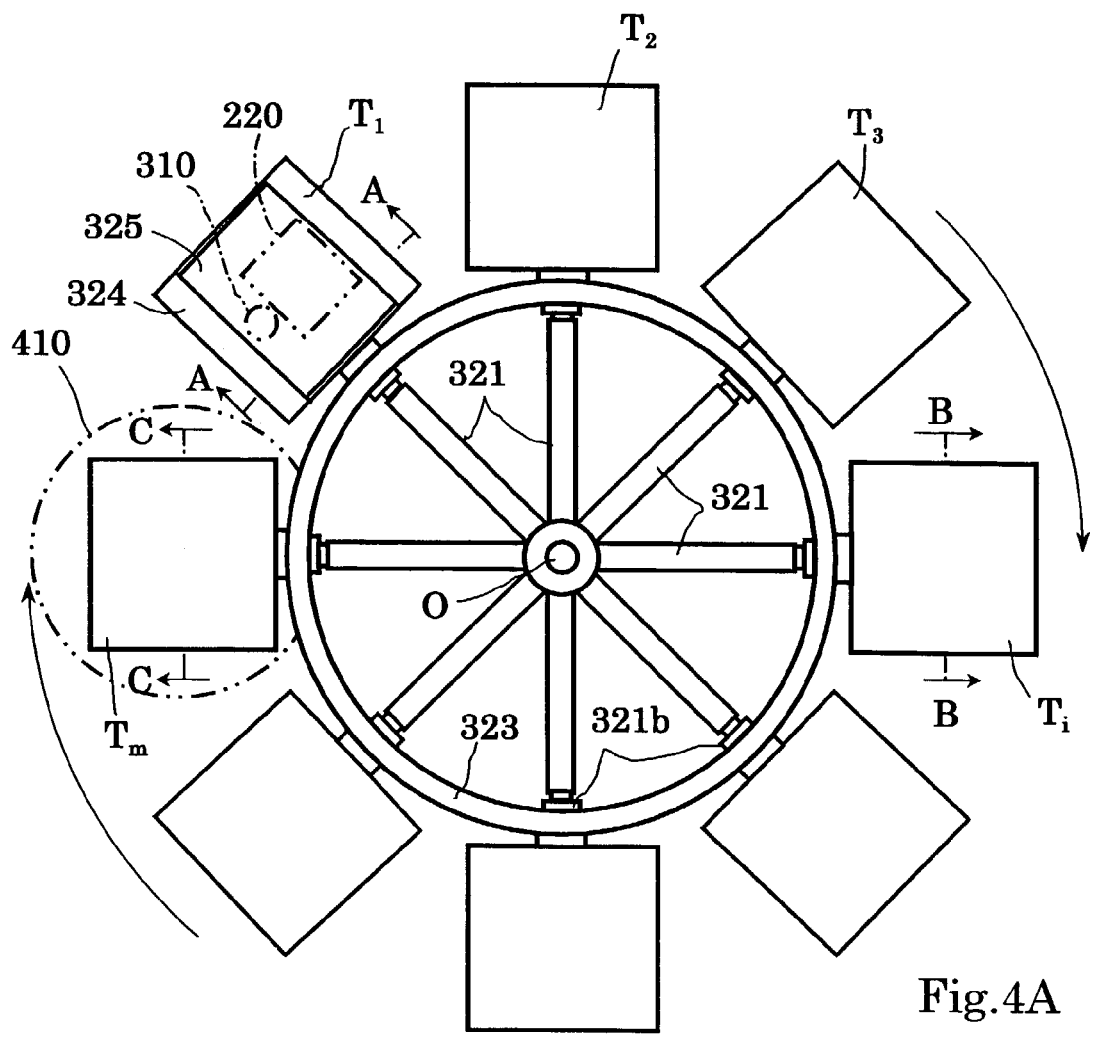
FIG. 4A is a plan view of a mixing device and FIG. 4B is a side view of a portion of a mechanism for rotating the drum.
Figure 4B:
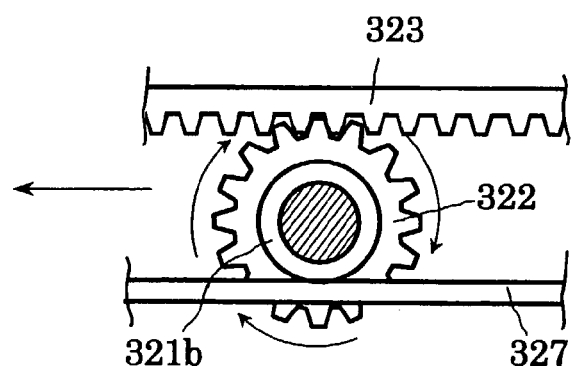

FIG. 3 shows an example of the mixing device 320, structured such that a plurality of small drums $T_1$–$T_m$ will rotate around a vertical axis of rotation 0 while each of them rotates around itself. Explained more in detail with reference to FIG. 4A, the drums $T_1$–$T_m$ are attached to the tips of arms 321 extending radially from the axis of rotation 0 such that as the central rotary shaft along the axis of rotation is rotated, the drums $T_1$–$T_m$ rotate horizontally together with the arms 321, as indicated by arcuate arrows. Each arm 321 carries on its end distal from the axis of rotation O a rotary member 321b adapted to rotate around its direction of extension. As shown in FIG. 4B, the rotary member 321b is connected to a fixed annular rack 323 and a pinion 322 such that, as the arms 321 rotate horizontally around the axis of rotation O, the pinion 322 engaging with the fixed rack 323 rotates along the rack 323. As a result, the rotary member 321b which is integrally formed with the pinion 322, as well as the associated one of the drums $T_1$–$T_m$, will rotate around the axis of rotation of the arm 321.

Figure 5B:
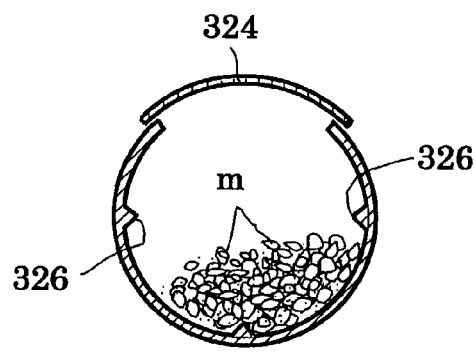
Figure 5C:
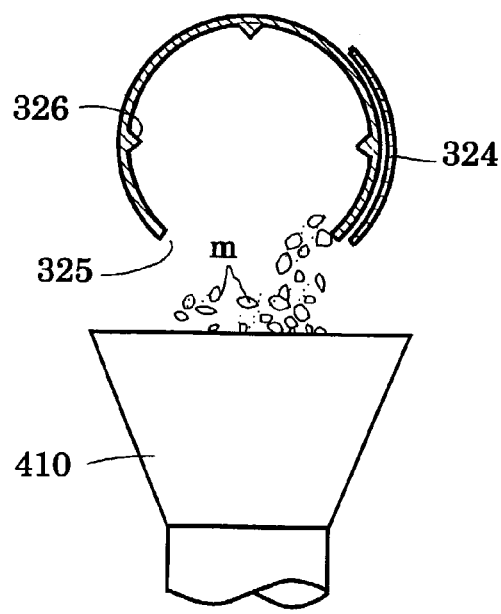

Each of the drums $T_1$–$T_m$ has an opening 325, provided with a sliding gate 324 biased by a spring (not shown) in the direction of closing it. When one of the drums $T_1$–$T_m$ reaches the receiving position for receiving unseasoned or unflavored food items (the position of drum $T_1$ in FIG. 3), its opening 325 is at an upwardly facing position, as shown in FIG. 5A, and the sliding gate 324 is opened. At the same time, another of the drums ($T_m$ in the example of FIG. 3) which is at the discharge position has its sliding gate 324 opened with its opening 325 facing in the vertically downward direction, as shown in FIG. 5C. At other positions, the drums $T_1$–$T_m$ have their sliding gates 324 closed, as shown in FIG. 5B, sealing inside both a batch of food items m and a flavoring material S.

As shown in FIG. 5, there are protrusions 326 inside the drums $T_1$–$T_m$ serving to stir and mix the food items and the seasoning material S together as the drums $T_1$–$T_m$ rotate. This results in the food items being uniformly coated with the flavoring material. Numeral 223 in FIG. 3 indicates the gate of the timing hopper 220 and numeral 327 in FIG. 4B indicates a frame for supporting tip parts of the arms 321.

When a discharge requesting signal S6 is outputted from the packaging device 400, the control device 330 stops drum $T_m$ directly above a chute 410 of the packaging device 400. At the same time, drum $T_1$ stops at a position directly below the timing hopper 220. Thereafter, the control device 330 opens the slide gates 324 of these two drums $T_1$ and $T_m$ and outputs a discharge end signal S7 to the packaging device 400 and a discharge requesting signal S2 to the weighing device 200.

As the discharge requesting signal S2 is received, the weighing device 200 opens the timing hopper 220 and transmits a discharge end signal S8 to the control device 330. Thereupon, the control device 330 controls the supplying device 310 to cause an appropriate amount of the seasoning material S according to the weight of the food items m to be discharged, closes the gates 324 and rotates the drums $T_1$–$T_m$.

Thus, each of the drums $T_1$–$T_m$ is stopped whenever it comes to the position directly above the packaging device 400 and discharges the seasoned food items down to the packaging device 400. At the same time, the emptied drum receives a new batch of food items from the timing hopper 220 and a specified amount of the flavoring material S is added from the supplying device 310. Thereafter, the control device 330 rotates the drums $T_1$–$T_m$ such that the food items m and the flavoring material S are stirred together.

Examples of the packaging device 400 includes those adapted to open a bag and filling items in the opened bag and the so-called vertical pillow type adapted to form an elongated film into a tubular shape while filling it with items, to seal simultaneously the top of the filled bag and the bottom of a next bag to be filled and to cut the film in between. With such a vertical pillow type packaging device, bags which are not sealed or cut can be produced temporarily by changing its mode of operation. Thus, when the control unit has received an error signal S3 from the weighing device 200 or a discharge abnormality signal S5 from the seasoning device 300, a mode changing signal S9 may be outputted to the packaging device 400 to change the mode of its operation such that properly produced products and defective products can be easily distinguished from the ways they are packaged.

The aforementioned sorting device 500 is for the purpose of eliminating defective ones of the bags B from the production line described above in response to a signal S10 from the control unit 700. If it is disposed on the downstream side of the packaging device 400, as is the case according to the embodiment being described, it may appropriately comprise a sorting conveyor. If it is disposed between the flavoring device 300 and the packaging device 400, it may comprise a switching chute adapted to change the direction of discharge in response to a command signal. Thus, although an error may be committed in the flavoring process, defective products can be dependably prevented from being shipped.

The packing device 600 is for packing the completed bags B in cardboard boxes for shipment and also serves to count the number of bags B which have been handled. The counted number is transmitted to the control unit 700 to be used in production management.

The control unit 700 is for controlling the devices 200, 300, 400, 500 and 600 in proper coordination and includes an input/output device 710 for communicating with these devices to control them individually and a memory 720 for storing production data on products for each kind, for example, as shown in FIG. 6. The memory 720 stores data for each kind of product such as the kind of flavoring material to be applied, the rate of its application, the speed of operation of the packaging device (say, in bpm=bags per minute), the weight of each bag to be produced and the planned number of bags to be produced. If the user operates on the input/output device 710 to input a product (code) number, various data on the corresponding kind of product are retrieved and transmitted to the individual ones of the corresponding devices. For example, the data on the kind and rate of application of the flavoring material are transmitted to the flavoring device 300, the speed of operation is transmitted to the packaging device 400 and the weight of each bag is transmitted to the weighing device 200. The planned number of products is set in a microcomputer 730.

When the user operates a start key displayed on the input/output device 710, the control unit 700 starts to control the devices from the upstream side, recording the numbers of processed batches (or bags) individually by the devices 200, 300, 400, 500 and 600. From these data, the microcomputer 730 calculates the number of batches (or bags) yet to be processed. If this value becomes zero for any of these devices, a stop command is delivered to the corresponding device to stop its operations.

In the case of an error where defective products have been produced and eliminated, the deficiency caused thereby is added to the planned number of products for the devices on the upstream side such that a desired number of finished products will be produced. In this manner, a desired planned number of products can be obtained without producing a waste.

Since the flavoring device is adapted to flavor only one batch of food items at a time, it need not be as big as the conventional devices. Thus, a plurality of flavoring devices each for applying a different kind of flavoring material may be provided such that differently flavored food products can be produced easily by appropriately exchanging them.

Alternatively, a plurality of supplying devices 310 for different kinds of flavoring materials may be provided such that their outlets are all adjacent to the opening 325 of the mixing device 320 and the kind of flavoring material can be selected. In such an application, each drum of the mixing device 320 may be selectively used for a flavoring material. For example, one kind of flavoring material may be added to even-numbered drums and another kind of flavoring material may be added to odd-numbered drums. Since none of these drums is going to have different kinds of flavoring materials, there is no need to wash the mixing device 320.

It is also possible, as another application, to produce one bag at a time of differently flavored food items in a sequential manner such that a series of differently flavored packages can be produced, as could not be done by the prior art technology.

The invention has been described above by way of a system with one production line to carry out weighing, flavoring, packaging and packing but a distributing device such as disclosed in Japanese Patent Publication Tokko 4-35132 may be used if a plurality of such production lines are used on the upstream side of the transporting device 100 for each of the production lines such that food items can be distributed among the production lines uniformly. If each production is associated with a specified kind of seasoning material in such a system, products of different kinds can be produced simultaneously immediately before they are packaged and items which are left over can be returned and recycled to another production line.

Figure 7:
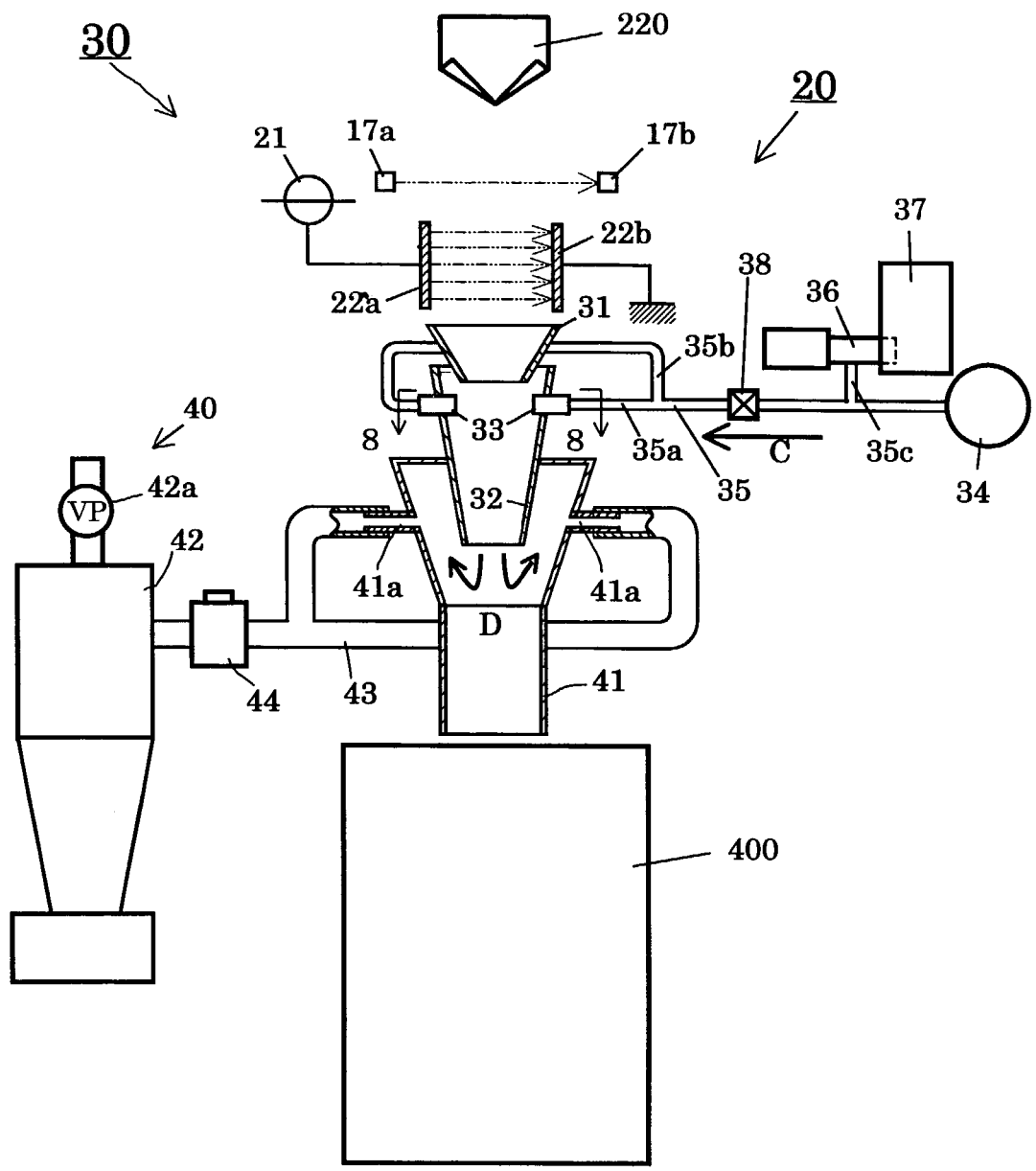
FIG. 7 is a schematic block diagram of another flavoring device.

The seasoning device 300 described above is convenient when flavoring materials of different types are used because a plurality of rotary drums are used. FIG. 7 shows another kind of flavoring device 30 suited for flavoring materials in a powder form.

As shown in FIG. 7, there is a charging device 20 directly below the timing hopper 220 for electrically charging the unflavored food items as they are dropped from the timing hopper 220. This charging device 20 is composed of a grounded electrode 22b and another electrode 22a connected to a high-voltage source 21. As the dropped food items fall between these electrodes 22a and 22b, they are charged in a specified polarity. Such a charging device 20, however, may be dispensed with if the weighing device 200 and the timing hopper 220 are made of a dielectric material because the food items that are dropped are kept at the ground level.

Figure 8:
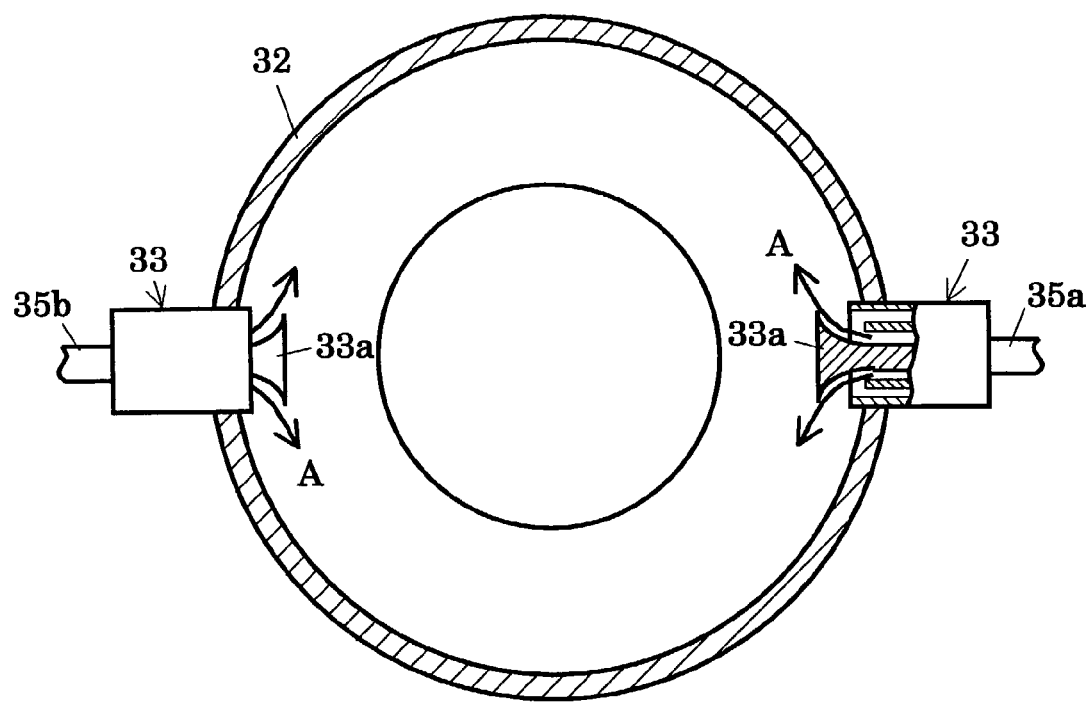
FIG. 8 is a sectional view taken along line 8—8 in FIG. 7.

Below the charging device 20 are a receiving chute 31 and a flavoring chute 32 provided with a pair of electrostatic guns 33. These electrostatic guns 33 are for spraying the flavoring material in the powder form after charging it in a specified polarity, installed opposite each other on the wall surfaces of the seasoning chute 32. The tips of the nozzles of the guns 33 are connected through branch pipes 35a and 35b to a pipe 35 leading to a compressor 34. A screw-type supplying device 36 is connected to another branch pipe 35c on the upstream side on the pipe 35 for supplying the flavoring material from a storage tank 37. The nozzles at the tips of the electrostatic guns 33 are each provided with a trumpet-shaped deflector 33a, as shown in FIG. 8, such that the flavoring material in the powder form will be dispersed as shown by arrows A.

Figure 9:
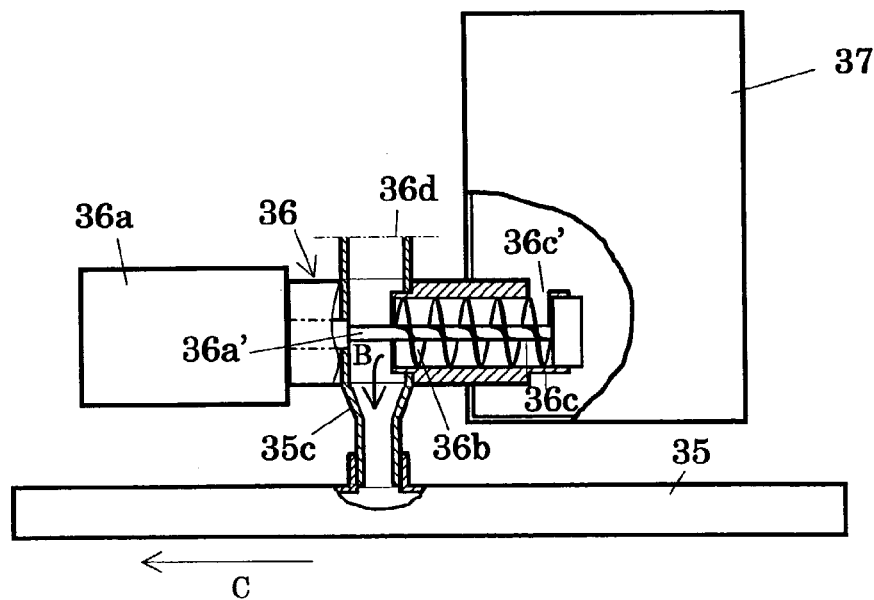
FIG. 9 is a partially sectional view of the flavoring dispenser.

As shown in FIG. 9, the supplying device 36 is provided with a screw 36b attached to the main shaft 36a' of a driver motor 36a and a cylinder 36c which contains them. The cylinder 36c has a hole 36c' at its tip, opening to the interior of a tank 37 for the flavoring material. As the driver motor 36a is switched on to rotate the screw 36b, the flavoring material inside the tank 37 is taken into the cylinder 36c and discharged into the pipe 35, as indicated by arrow B. An air inlet 36d is provided on the other side of the screw 36b, being connected to the branch pipe 35c serving as a path for compressed air and led to the tips of the nozzles of the electrostatic guns 33, as indicated by arrow C. The pipe 35 also includes a switch valve 38 for adjusting the flow rate of the flavoring material in the powder form containing air.

As shown in FIG. 7, there is a collecting device 40 for the flavoring material, having a discharge chute 41 which covers the bottom portion of the seasoning chute 32 and leading to the packaging device 400. A pair of suction openings 41a is provided at an elevated portion of the discharge chute 41 for connecting to a cyclone 42 for removing the excess seasoning material through a pipe 43. The cyclone 42 is connected with a vacuum pump 42a for exhausting air. A switch valve 44 is provided in the pipe 43 for controlling the collection of the seasoning material in the powder form.

Figure 10:
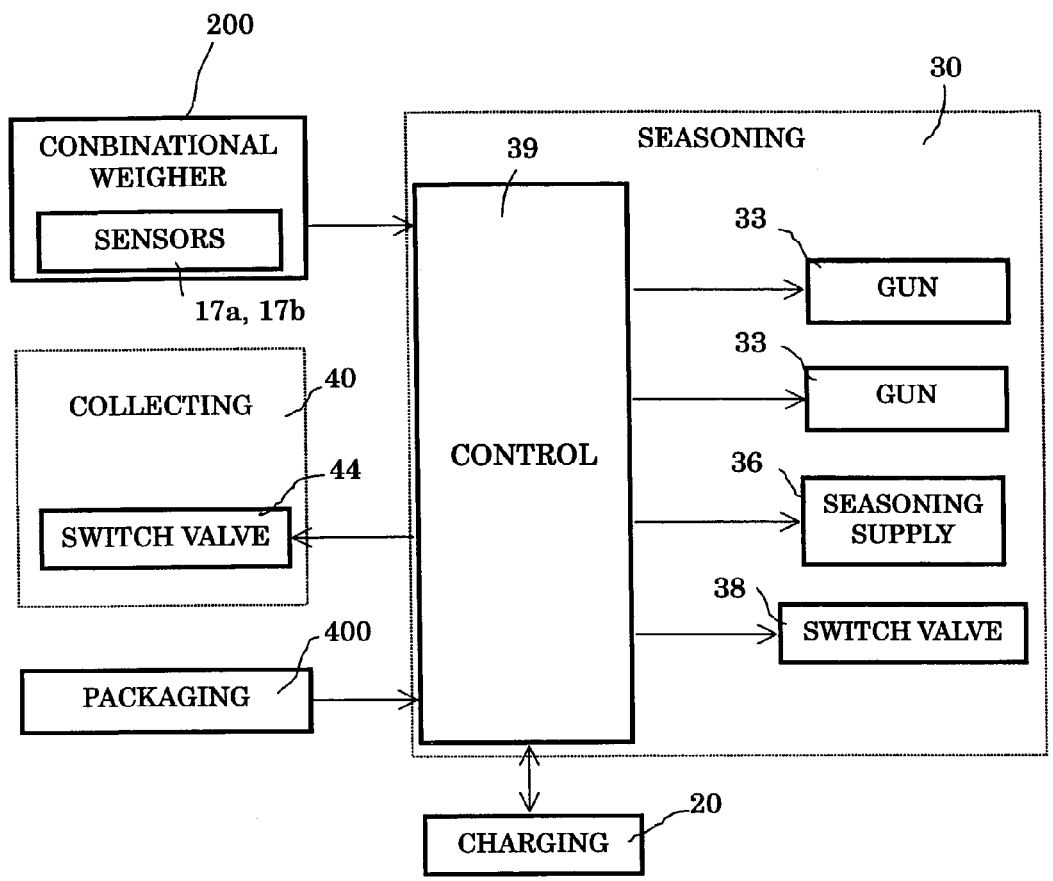
FIG. 10 is a block diagram of a control system.

Next, the operation of the flavoring device 30 of FIG. 7 will be explained. As a batch of food items is discharged from the timing hopper 220, their passage is detected by sensors 17a and 17b. As their detection signals are received, the control device 39 (FIG. 10) for the flavoring device 30 activates the electrostatic guns 33.

The food items which have passed through the charging device 20 are charged in a specified polarity and are dropped from the receiving chute 31 to the flavoring chute 32. At the same time, the flavoring material in the powder form is taken out of the tank 37 through the supplying device 36 at a specified rate. As it is led into the pipe 35 through the branch pipe 35c, it is sprayed by compressed air into the flavoring chute 32 through the nozzles of the electrostatic guns 33. Since the flavoring material and the food items are charged oppositely in polarity, the flavoring material in the powder form floating in the travel path of the food items is electrostatically attracted by the falling food items and becomes attached thereto. Thus, the floating flavoring material is dependably and instantly attached to the food items.

The rate of supply of the flavoring material can be adjusted by controlling the speed of rotation of the screw 36b through the control device 39. The time of air supply and the flow rate can be controlled by adjusting the switch valve 38. The rate of spray of the flavoring material can thus be controlled at will. The deflectors 33a at the tips of the nozzles of the electrostatic guns 33 serve to have the flavoring material sprayed in directions not perpendicular to the direction of fall of the food items. Thus, the flavoring material being ejected does not inhibit the free fall of the food items and has no adverse effect on the high-speed flavoring process. The control unit 700 may be programmed to change the rate of spray according to the weight of the batch of food items being dropped.

Parts of the flavoring material that were sprayed into the seasoning chute 32 but failed to attach to a food item are collected by the cyclone 42 through the discharge chute 41, as indicated by arrow D in FIG. 7, as the switch 44 is opened. Thus, the waste of the flavoring material can be avoided. Moreover, this prevents the defective sealing by the packaging device 400 disposed below the discharge chute 41 due to the presence of excess powder particles of the flavoring material. The collected flavoring material can be recycled and used again.

The examples described above are intended to be illustrative, not as limiting the scope of the invention. Many modifications and variations are possible within the scope of the invention. For example, more than two electrostatic guns may be used for more evenly attaching the flavoring material onto the falling food items. Although sensors 17a and 17b were used for detecting the passage of food items being dropped, these sensors may be dispensed with by using the opening signal of the timing hopper 220 as a substitute. It also goes without saying that the packaging device to be used in a system embodying this invention need not be of a vertical pillow type. Any device adapted to fill a bag with the flavored food items may be incorporated into a system of this invention.

What is claimed is:

1. A flavoring system comprising:
    a portioning device for receiving items and sequentially supplying batches of a specified quantity of said items;
    a flavoring dispenser for dispensing measured quantities of a flavoring material;
    an applying device downstream of said portioning device for individually applying said measured quantities of flavoring material to said batches of items;
    a packaging device downstream of said applying device for packaging in a bag said batch of items;
    a sensor for monitoring discharge of flavoring material;
    a sorting device for discarding a packaged product packaged by said packaging device responsive to an output from said sensor indicating an abnormality in said discharge of said flavoring material; and
    a control unit for operating said portioning device and said flavoring dispenser in a mutually correlated manner, said control unit being adapted to respond to said portioning device discharging a defective batch not having said specified quantity of said items by inhibiting said flavoring material from being applied to said defective batch discharged from said portioning device by either of said applying device and said flavoring dispenser;
    wherein said applying device includes a charging device for electrically charging particles of said flavoring material and an ejecting device for ejecting said electrically charged particles of said flavoring material towards said items of said batch; and
    wherein said applying device includes a charging device for electrically charging particles of said flavoring material and an ejecting device for ejecting said electrically charged particles of said flavoring material towards said items of said batch.

2. The flavoring system of claim 1 wherein said applying device applies said flavoring material at a set ratio to each of said batches of said specified quantity.

3. The flavoring system of claim 1 wherein said applying device and said dispenser are exchangeably attached to said flavoring system.

4. The flavoring system of claim 1 wherein said applying device includes a mixing device for mixing together said flavoring material and each of said batches of items.

5. The flavoring system of claim 1 wherein said applying device is one of a plurality of applying devices receiving said items from a common supplying device, each of said plurality of applying devices applying a different flavoring material.

6. The flavoring system of claim 1 wherein said packaging device is a vertical pillow packaging machine which serves to form an elongated film into a tubular form to produce a bag while filling said bag with said batch of items, to seal said film between said bag and another bag being subsequently formed, and to cut said film to separate said bag from said another bag.

7. The flavoring system of claim 1 wherein said applying device serves to coat the items with the flavoring material.

8. The flavoring system of claim 1 comprising a plurality of flavoring dispensers each serving to dispense measured quantities of a different flavoring material.

9. A flavoring system comprising:
a portioning device for receiving items and sequentially supplying batches of a specified quantity of said items;
a flavoring dispenser for dispensing measured quantities of a flavoring material;
an applying device downstream of said portioning device for individually applying said measured quantities of flavoring material to said batches of items;
a packaging device downstream of said applying device for packaging in a bag said batch of items;
a sensor for monitoring discharge of flavoring material;
a sorting device for discarding a packaged product packaged by said packaging device responsive to an output from said sensor indicating an abnormality in said discharge of said flavoring material; and
a control unit for operating said portioning device and said flavoring dispenser in a mutually correlated manner, said control unit being adapted to respond to said portioning device discharging a defective batch not having said specified quantity of said items by inhibiting said flavoring material from being applied to said defective batch discharged from said portioning device by either of said applying device and said flavoring dispenser;
wherein said applying device includes a charging device for electrically charging particles of said flavoring material and an ejecting device for ejecting said electrically charged particles of said flavoring material towards said items of said batch; and
wherein said portioning device comprises a weighing device which serves to supply said items to a plurality of weigh hoppers, to measure the individual weights of the items in said weigh hoppers, to select a combination of said weigh hoppers with a specified weight on the basis of the measured weights and to thereby supply one of said batches.

10. The flavoring system of claim 9 wherein said applying device applies said flavoring material at a set ratio to each of said batches of said specified quantity.

11. The flavoring system of claim 9 wherein said applying device and said dispenser are exchangeably attached to said flavoring system.

12. The flavoring system of claim 9 wherein said applying device includes a mixing device for mixing together said flavoring material and each of said batches of items.

13. The flavoring system of claim 9 wherein said applying device is one of a plurality of applying devices receiving said items from a common supplying device, each of said plurality of applying devices applying a different flavoring material.

14. The flavoring system of claim 9 wherein said packaging device is a vertical pillow packaging machine which serves to form an elongated film into a tubular form to produce a bag while filling said bag with said batch of items, to seal said film between said bag and another bag being subsequently formed, and to cut said film to separate said bag from said another bag.

15. The flavoring system of claim 9 wherein said applying device serves to coat the items with the flavoring material.

16. The flavoring system of claim 9 comprising a plurality of flavoring dispensers each serving to dispense measured quantities of a different flavoring material.

* * * * *